March 16, 1971 ISAMU ICHINOSE ETAL 3,570,039
WINDSHIELD WIPER ASSEMBLY FOR AN AUTOMOBILE
Filed July 18, 1969 8 Sheets-Sheet 1

INVENTORS
YOICHI MORI AND
ISAMU ICHINOSE
BY
John Lezelley
ATTORNEY

March 16, 1971   ISAMU ICHINOSE ETAL   3,570,039
WINDSHIELD WIPER ASSEMBLY FOR AN AUTOMOBILE
Filed July 18, 1969   8 Sheets-Sheet 5
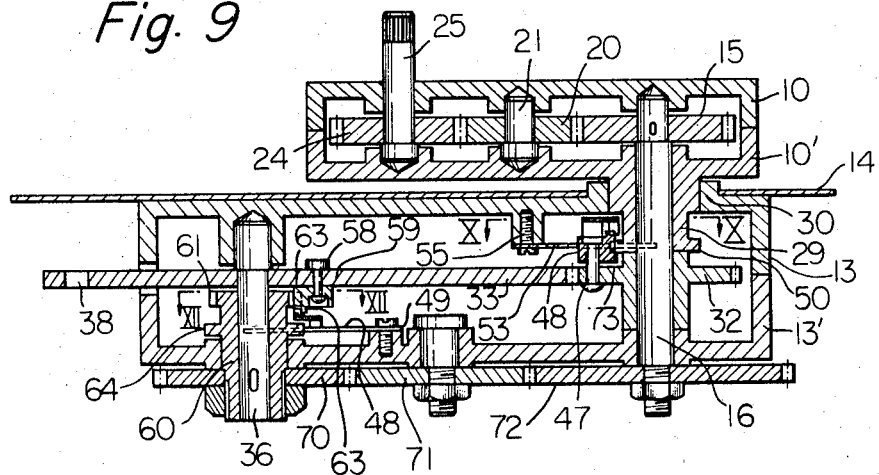
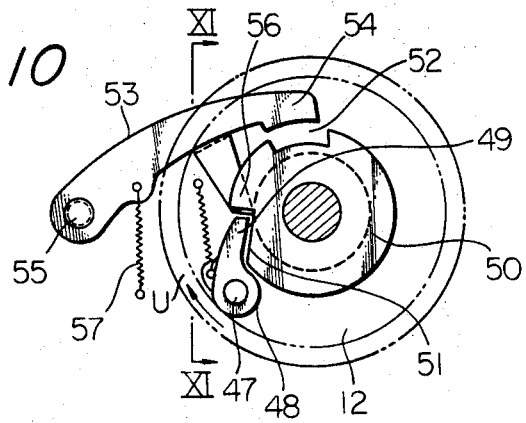
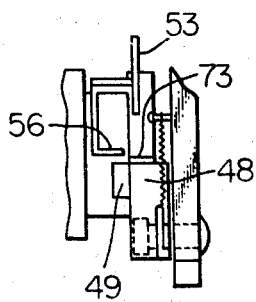
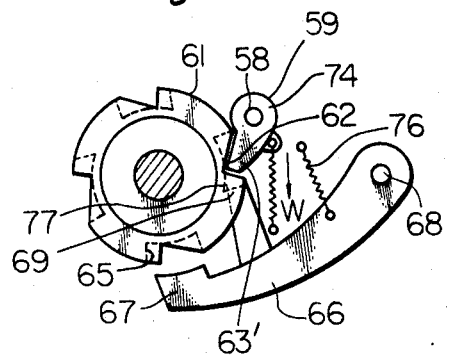
INVENTORS
YOICHI MORI
ISAMU ICHINOSE
BY John Lezdey
ATTORNEY March 16, 1971   ISAMU ICHINOSE ETAL   3,570,039
WINDSHIELD WIPER ASSEMBLY FOR AN AUTOMOBILE
Filed July 18, 1969   8 Sheets-Sheet 6

INVENTORS
YOICHI MORI
ISAMU ICHINOSE
BY John Lezdley
ATTORNEY

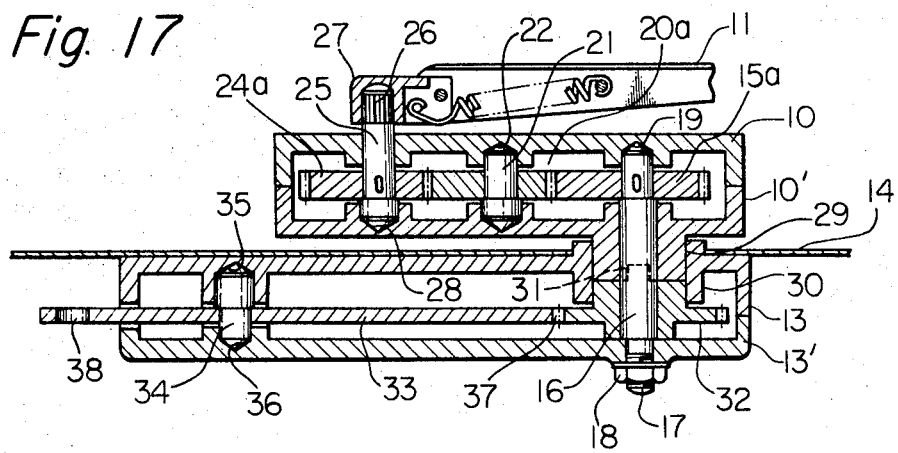
Fig. 17
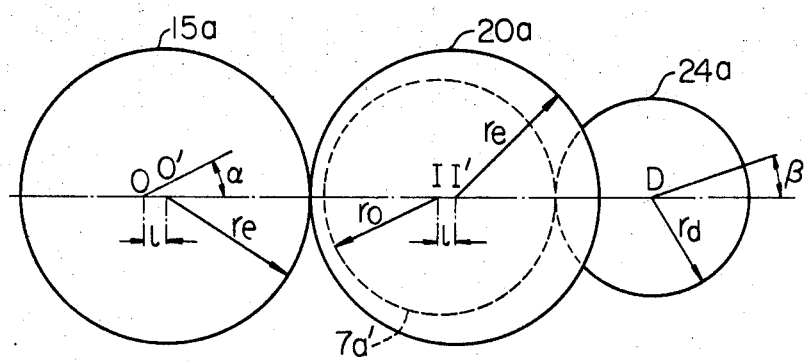
Fig. 18-A
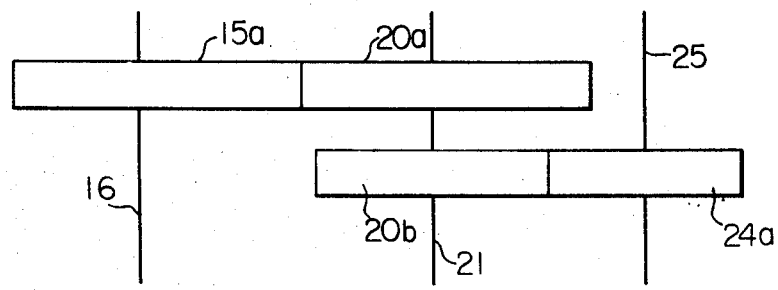
Fig. 18-B
INVENTORS
YOICHI MORI
ISAMU ICHINOSE
BY John Lindsey
ATTORNEY

United States Patent Office 3,570,039
Patented Mar. 16, 1971

3,570,039
WINDSHIELD WIPER ASSEMBLY FOR AN AUTOMOBILE
Isamu Ichinose, 3–68–1 Oppamahigashi-cho, Yokosuka, Japan, and Yoichi Mori, 402 Baba-cho, Tsurumi-ku, Yokohama, Japan
Filed July 18, 1969, Ser. No. 843,023
Claims priority, application Japan, Dec. 30, 1968, 44/96,607
Int. Cl. A47l 1/00; B60s 1/02
U.S. Cl. 15—250.13                    12 Claims

ABSTRACT OF THE DISCLOSURE

A windshield wiper assembly for an automobile having a wiper arm which moves reciprocally around a rotating center provided at the edge of a crank arm rotating around a point and a wiper blade mounted on the wiper arm for wiping a vehicle windshield in a movement following a trochoidal curve.

---

This invention relates to a windshield wiper assembly, and more particularly to improvements of a windshield wiper assembly adapted to enlarge the wiping area by operating a blade along a trochoidal curve.

The conventional windshield wiper moves circularly on the windshield of the automobile, which does not wipe a sufficiently large area of the windshield.

A trochoidal curve is generally known as a trace of a point on the radius of the rotating circle on the outer periphery of a base circle in circumscripting relationship and also a trace of a point on the circle on the inner periphery of the base circle in inscripting relationship, and the former is termed as a hypotrochoid and the latter epitrochoid.

The trochoidal curve is generally expressed by the following formulas:

$$x = r_2 \cos \theta - r_1 \cos m\theta \quad (1)$$

$$y = r_2 \sin \theta + r_1 \sin m\theta \quad (2)$$

where $r_2$ is a distance between the center of the base circle and the center of the rotating circle, $r_1$ is a distance between the center of the rotating circle and a point on the radius of the circle, and $m$ is a ratio of an angular velocity of the point on the radius of the rotating circle with respect to the center to an angular velocity of the center of the rotating circle with respect to the center of the base circle. In the aforementioned Formula 2, the sign (+) indicates the case of the hypotrochoid while the sign (−) designates the case of the epitrochoid.

If a certain radius rotates around one end of the radius as a center at an angular velocity $m\theta$ and another radius rotates around the other end of the previous radius as a center at an angular velocity $\theta$, the other end of the latter radius draws a trochoidal curve. In the following description the former radius is termed as a crank and the latter radius is termed as an arm. When the crank and the arm rotate in the same direction, the outer end of the arm draws an epitrochoidal curve while when the crank and the arm rotate in opposite directions, the outer end of the arm draws a hypotrochoidal curve.

If a part of either the epitrochoidal or the hypotrochoidal curve is applied to the movement of the windshield wiper, the latter sweeps the windshield within an area similar to the rectangular form of the windshield.

It is, therefore, the object of the present invention to provide a new and improved windshield wiper which wipes the windshield over an enlarged area by sweeping in a form similar to the shape of the rectangular windshield and to lessen the dead area between the two conventional wipers.

The above and other objects, features and advantages of the present invention will become apparent from the following description perused in conjunction with the accompanying drawings, in which:

FIG. 9 is a longitudinal section view of another blade interlocking mechanism operating according to the principle shown in FIG. 8;

FIG. 10 is a plan view of a ratchet device used in the blade interlocking mechanism shown in FIG. 9 taken along the lines 10—10 seen in the direction of arrows therein;

FIG. 11 is a side view of the ratchet device taken along the lines 11—11 seen in the direction of arrows in FIG. 10;

FIG. 12 is a plan view of the other ratchet device used in the blade interlocking mechanism shown in FIG. 9 along the lines 12—12 seen in the direction of the arrows therein;

FIG. 17 is a longitudinal section view of the mechanism shown in FIG. 16 embodying the principle of this invention shown in FIGS. 15 and 16; and FIGS. 18–A and 18–B are explanatory illustrations of still another embodiment of the blade interlocking mechanism of the present invention showing side and plan views of the gearing used in the mechanism.

Figure 1:
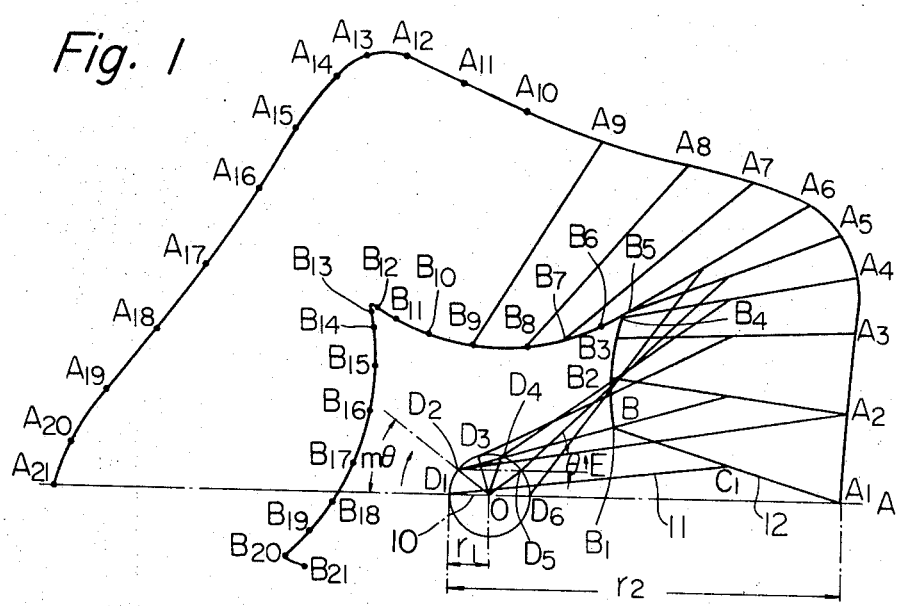
FIG. 1 is an explanatory illustration of how to draw a hypotrochoidal curve with the crank and arm of the windshield wiper according to the present invention.

In order to clearly understand the principle of the blade interlocking mechanism operating in accordance with the present invention, the explanatory illustration for drawing the hypotrochoidal curve by the combination of a crank and an arm shown in FIG. 1 is referred to so as to explain the theoretical background thereof.

Although the present invention may adopt either epitrochoidal or hypotrochoidal movements to be applied to the blade interlocking mechanism, an example of a windshield wiper assembly using the blade interlocking mechanism according to the hypotrochoidal movement will be hereinafter described.

In FIG. 1, when the crank OD having a radius $r_1$ rotates around a center O at an angular speed of $m\theta$ and the arm DA having a radius $r_2$ revolves around a center D at an angular speed of $\theta$, the end point A of the arm DA draws a trochoidal curve. The crank OD and the arm DA rotate in opposite directions so that the end point A draws a hypotrochoidal curve. More particularly, the structural composition of the windshield wiper assembly consists of the crank OD termed as a crank arm 10, a wiper arm 11 designated by DC and a blade 12 designated by AB and fixed to the end C of the wiper arm 11 with a certain constant angle with each other at the center point O.

When the crank arm 10 rotates in one direction to an angle $m\theta$ designated by $D_1OD_2$, the wiper arm 11 rotates in an opposite direction to an angle $\theta$ designated by $ED_2A_2$ respectively. Thus, when the crank arm 10 and the wiper arm 11 rotate, the end A of the blade 12 traces the curves $A_1$, $A_2$ $A_3$ . . . while the other end B traces the curves $B_1$, $B_2$, $B_3$ . . . FIG. 1 shows half of a hypotrochoidal curve having five folia when the parameter $m$ is equal to four.

If $r_1$=OD and $r_2$=DA are employed in the aforementioned formula the locus of the point A is obtained. Similarly, the locus of the point B is attained but has out of phase in the rotation of the radii $r_1$ and $r_2$.

Figure 2:
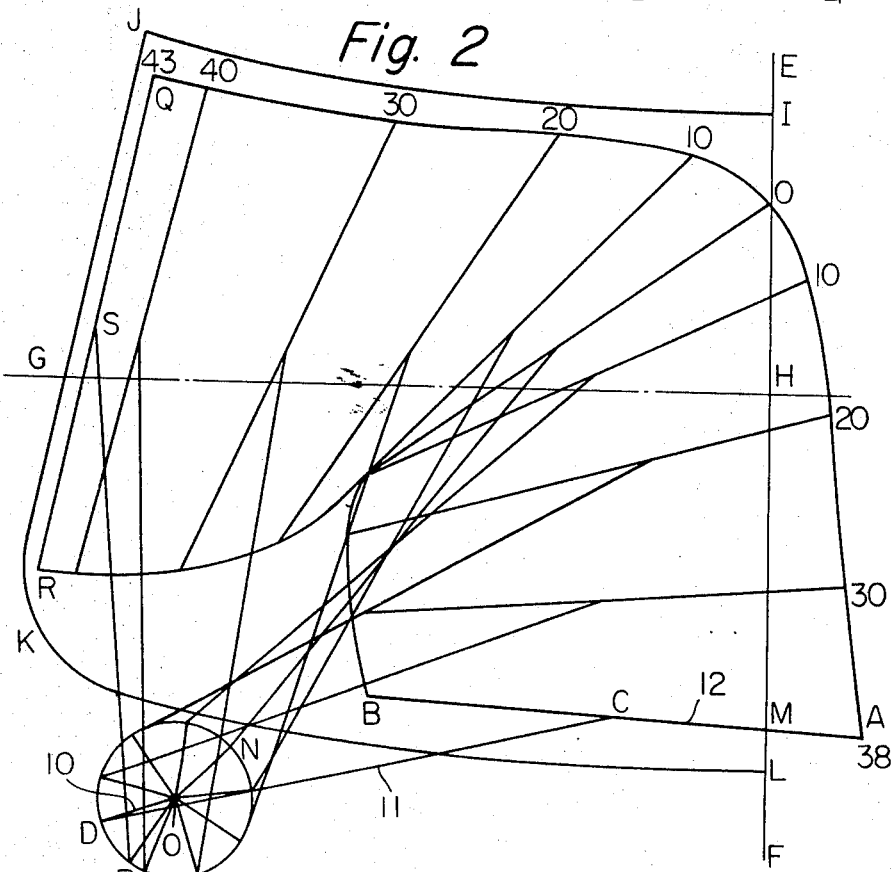
FIG. 2 is an explanatory view of the left half part of the wiped area by the windshield in accordance with the present invention.

FIG. 2 shows the left half part of the area wiped by the windshield wiper of an automobile embodying the present invention. In the drawing the line EF is a center line of the automotive vehicle. The curve IJKL shows the edge of the left half of the windshield of the automobile. The line HG illustrates the eye level of the driver of the automobile.

It is understood that the wiper may wipe to the line JK at the most.

It is also understood from the drawing that since both the left and right windshield wiper blades when not used, are retained in the neighbourhood of the center portion of the windshield, they are substantially parallel with the lower edge of the windshield whereupon the wiper blades may be placed as low as possible with the result that the interference between the right and the left wiper blades may be easily avoided in operation.

Figure 3:
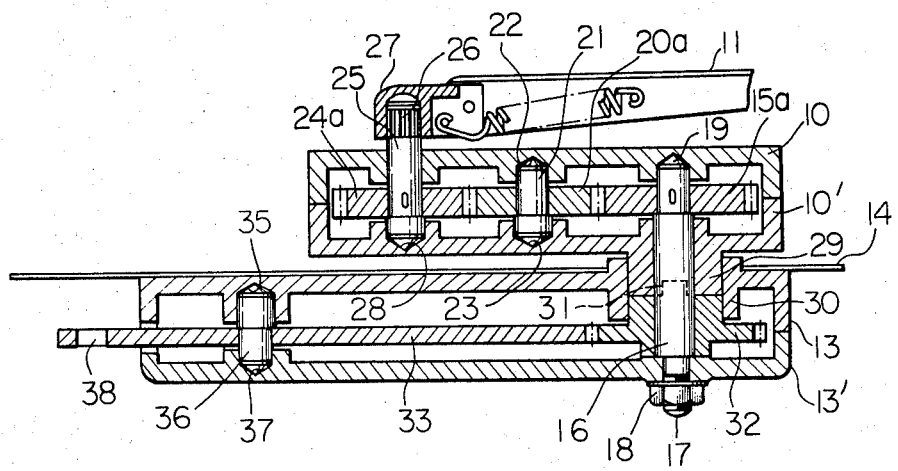
FIG. 3 is a longitudinal section view of a blade interlocking mechanism of the windshield wiper according to the present invention.

In FIG. 3, which shows a blade interlocking mechanism of the windshield wiper assembly embodying the present invention, the mechanism comprises a crank arm 10, a wiper arm 11 which is at one end fixed at the intermediate of a blade 12, a blade 12 fastened at its center to the wiper arm 11, covers 13 and 13' of a casing mounted to the vehicle body 14, an interlock gearing including a base or drive gear 15 having a radius $r_3$ of a pitch circle and calked to a shaft 16 having a thread 17 for securing the shaft 16 to the cover 13' of the casing with a nut 18 at its one end and placed at the other end within a hole 19 of the crank arm 10, an intermediate or idle gear 20 meshed with the drive wheel 15 and carried on a shaft 21 which is secured at both ends within holes 22 and 23 provided in the crank arm 10, and a driven gear 24 having a radius $r_4$ of a pitch circle and calked to a shaft 25 which has a serration 26 at one end for securing in a fixed position the root 27 of the wiper arm 11 thereto and is placed within a hole 28 of the crank arm 10' at the other end, a boss 29 of said crank arm 10' being rotatably engaged with a boss 30 of the cover 13' of the casing and having a recess 31, another drive gear 32 carried on the shaft 16, a sector 33 carried on a shaft 34 the ends of which are placed respectively within holes 35 and 36 of the covers 13 and 13' of the casing and having teeth meshed with the drive gear 32 and being reciprocally driven by a push rod (not shown) connected at the other end 38.

In operation of the blade interlocking mechanism, the crank arms 10 and 10' are connected to the drive gear 12 and sector 33 both driven by said push rod of the vehicle, when the base gear 15 is fixed by shaft 16 with cover 13'.

If the lengths of the radii $r_3$ and $r_4$ of the pitch circles of the gears 15 and 24, respectively, are determined in accordance to the formula $r_4/r_3=m/(m+1)$ and the base gear 15 is stationary while the crank arms 10 and 10' rotated to an angle of $m\theta$, the wiper arm 11 rotates to an angle of $\theta$ in opposite direction so that the end A of the blade 12 draws a hypotrochoidal curve. On the other hand, if the length of the radii $r_3$ and $r_4$ of the pitch circles of the gears 15 and 24, respectively, are determined in accordance to the formula $r_4/r_3=m/(m-1)$ and the base gear 15 is similarly stationary while the crank arms 10 and 10' are rotated in one direction, the wiper arm 11 rotates in the same direction so that the end A of the blade 12 draws an epitrochoidal curve as will be hereinafter proved.

Figure 4:
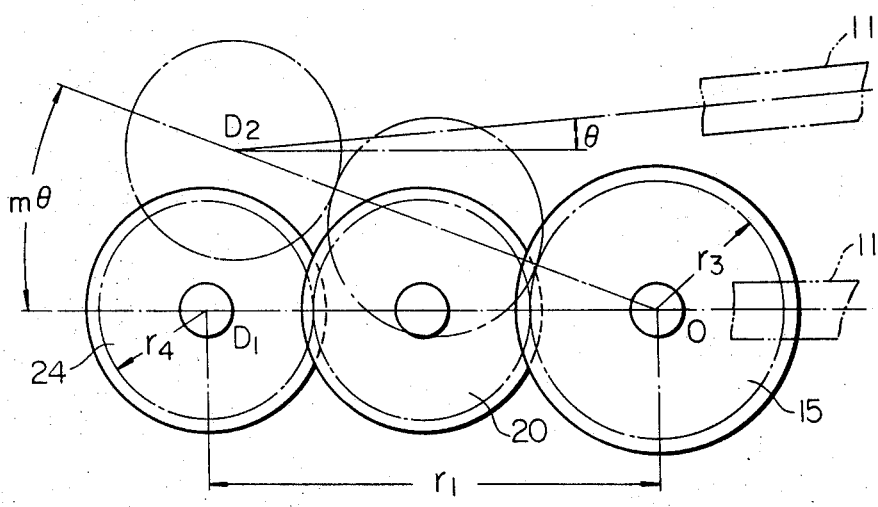
FIG. 4 is an explanatory illustration of the operation of the blade interlocking mechanism shown in FIG. 3.

The relationship of the rotating angles of between the crank arms 10 and 10', and the driven gear 24 will be hereinafter described with respect to FIG. 4, which shows an operation of the drive and driven gears 15 and 24, respectively, in the blade interlocking mechanism. At first, if the crank arm 10 is kept stationary and the drive gear 15 is rotated counterclockwise an angle of $m\theta$, the driven gear 24 rotates similarly counterclockwise. The rotation angle is inversely proportional to the radius of the pitch circle, accordingly the angle becomes $(m+1)\theta$ as derived from the aforementioned formula. Then, assuming that all the components are secured so as not to move and they are all rotated clockwise an angle of $m\theta$, the drive gear 15 rotates back counterclockwise to the original position, so that the crank arm 10 rotates clockwise an angle of $m\theta$ while the driven gear 24 remains rotated counterclockwise within an angle of $$\theta=\theta[(m+1)-m]$$

It follows that the wiper blade 12 draws a hypotrochoidal curve. This applies similarly to the case of the epitrochoidal curve.

Figure 5:
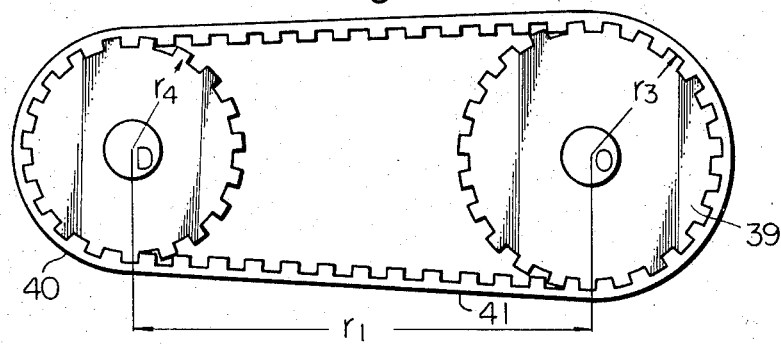
FIG. 5 is a plan view of timing wheels and a belt used in the blade interlocking mechanism operating similarly to the mechanism shown in FIG. 4.

Referring now to FIG. 5, which shows timing wheels and a belt used in the blade interlocking mechanism, the interlock device comprises a drive timing wheel 39 and driven timing wheel 40 having radii $r_3$ and $r_4$ of the pitch circles, respectively, and spaced within a radius $r_1$ betwen the centers of the wheels 39 and 40 by means of an arm (not shown), and a timing belt 41 engaged around the timing wheels 39 and 40 for transmitting the driving power from the drive timing wheel 39 to the driven wheel 40.

If the relationship of the radii $r_3$ and $r_4$ of the pitch circles of the timing wheels 39 and 40, respectively, is determined as $r_4/r_3=m/(m+1)$, the end point A of the blade 12 draws similarly to the interlock gearing in the aforementioned blade interlocking mechanism a hypotrochoidal curve while if the relationship of the radii $r_3$ and $r_4$ of the pitch circles of the timing wheels 39 and 40, respectively, is determined as $r_4/r_3=m/(m-1)$, the end point A of the blade 12 draws similarly a epitrochoidal curve.

Figure 6:
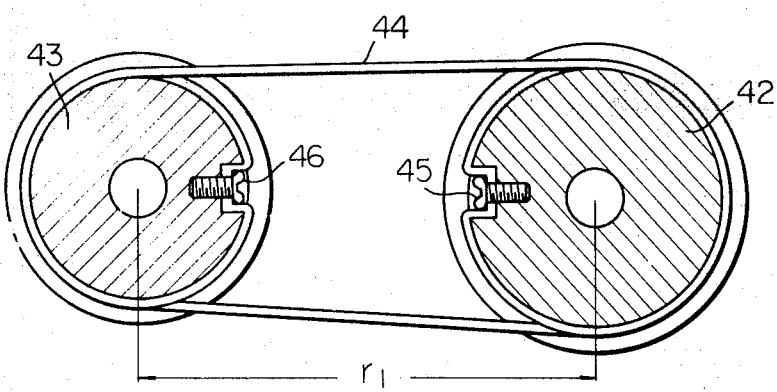
FIG. 6 is a plan view of another interlocking mechanism using wires and wheels operating also similarly to the mechanism shown in FIG. 4.
Figure 7:
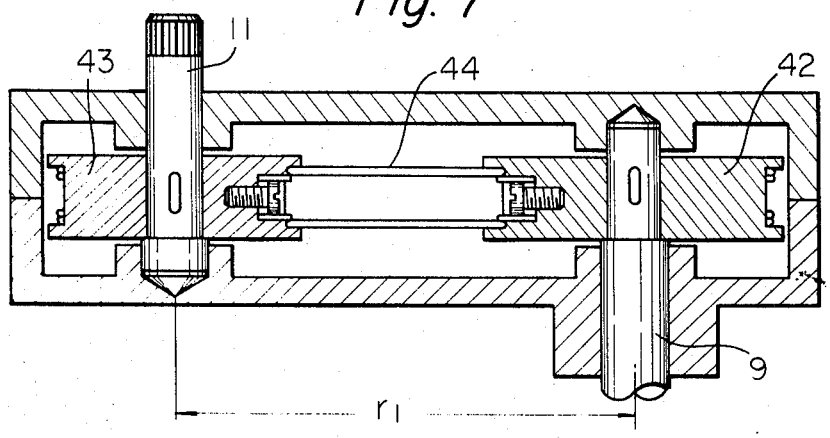
FIG. 7 is a longitudinal sectional view of the mechanism shown in FIG. 6.

FIGS. 6 and 7 show wires and wheels used in the interlock device in the blade interlocking mechanism. The interlock device comprises drive and driven wheels 42 and 43, respectively, and wires 44 for transmitting the driving power from the drive wheel 42 to the driven wheel 43, said wheels 42 and 43 having stopper screws 45 and 46, respectively, for preventing slipping of the wires relative to the wheels 42 and 43, respectively.

The wires 44 may be provided in a plurality of numbers on the wheels 42 and 43 so as not to lose their function if one of them is cut off accidentally. In this embodiment of the interlock device four wires are provided, two of which are wound on either side of the wheels 42 and 43.

The stopper screws 45 and 46 may be replaced by other means for fastening the ends of the wires 44 as by a pin or an adhesive.

The wires 44 may be substituted by a wide band to operate similarly to the above embodiment.

In the embodiments shown in FIGS. 5 to 7, if the crank arm 10 rotates around the center O to an angle of $m\theta$, the driven wheels 40 or 43 are accordingly driven to an angle of $\theta$ by the timing belt 41 or wires 44, respectively.

Figure 8:
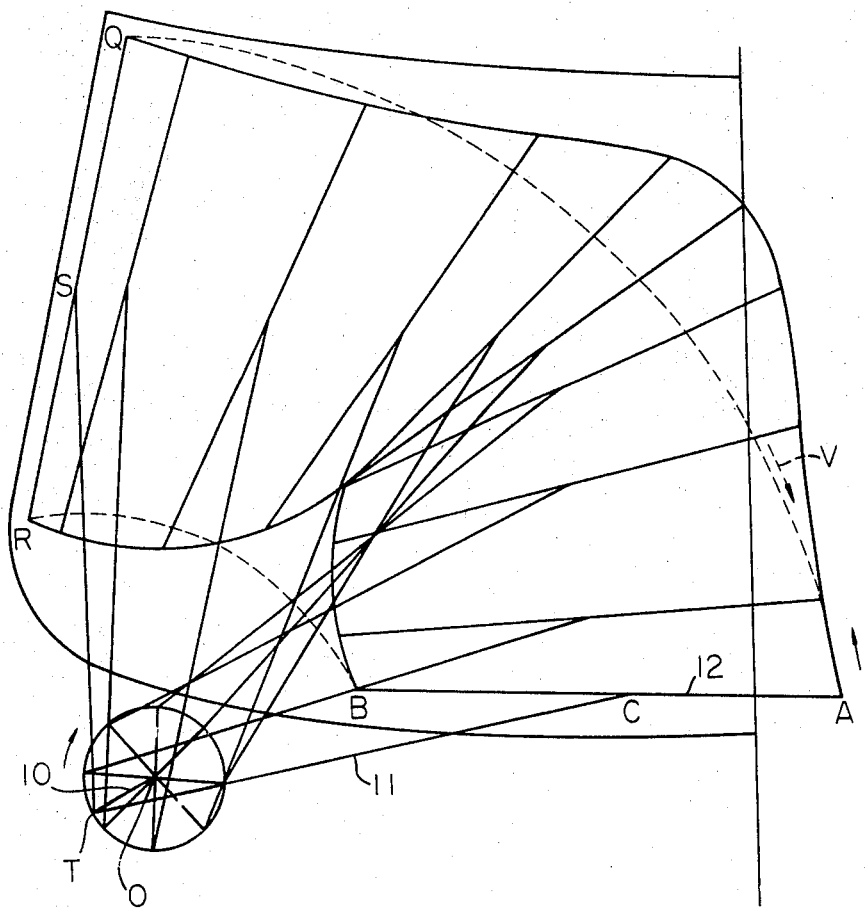
FIG. 8 is an explanatory illustration of a wiping area when the blade of the windshield wiper moves trochoidally in one way and the area covered by a circular movement on the return as an alternate to FIG. 1.

FIG. 8 shows the left part of the area wiped by the windshield wiper of an automobile according to an alternative operation of the first embodiment. The wiper blade 12 of this embodiment moves along a trochoidal curve when the blade 12 wipes from the position designated by AB counterclockwise while the blade 12 moves in a circular movement around the center point T when the blade 12 returns clockwise from the position designated by QR.

The drawing shows that the wiping area of the blade 12 increases in comparison with the previous embodiment, but the interlocking mechanism is somewhat complicated. In this case, the position of the blade 12 when it starts to wipe the windshield from the position designated by AB should be at the same position of the blade 12 when the blade 12 starts to return back from the position designated by QR at the center point T of the wiper arm 11.

In comparison of this embodiment shown in FIG. 8 with the first embodiment of the blade interlocking mechanism shown in FIG. 2, the rotating center of the wiper arm 11 when the blade 12 is in the position designated by AB is in position D, and as the blade 12 rotates counterclockwise the crank arm 10 rotates clockwise so that the center of the wiper arm 11 moves from the position designated by D through the position N to the point P. On the other hand, when the blade 12 rotates reciprocally from the position designated by QR clockwise the center of the wiper arm 11 moves counterclockwise from the position designated by P through the point N to the position designated by D. Therefore the value of the parameter $m$ of the embodiment shown in FIG. 8 is larger than that of the embodiment shown in FIG. 2.

FIGS. 9 through 12 show the blade interlocking mechanism embodying the operation shown in FIG. 8, wherein the same references are used. The blade interlocking mechanism comprises in addition to the components of the interlocking mechanism shown in FIG. 3, a pin 47 provided in the drive gear 32 without engaging the drive gear 32 with the crank arm 10', a ratchet claw 48 supported by the pin 47 and having a projection 49 projecting therefrom, a ratchet wheel 50 provided at the boss 29 of the crank arm 10 and formed with a cutout 51 (FIG. 10) on the periphery thereof engaged with the claw 48 and also formed with another cutout 52 on the outer periphery thereof, a stopper claw 53 having a projection 54 engaged with the cutout 52 and pivotally supported by a shaft 55 rotatably secured to the cover 13 of the casing and also having a branch portion 56 adapted to be engaged with the projection 49 of the ratchet claw 48, a spring 57 connected at one end with the cover 13 of the casing and at the other with the stopper claw 53, a pin 58 secured to the sector 33, another claw 59 pivotally supported by the pin 58, a sleeve 60 engaged with the shaft 34, another ratchet wheel 61 mounted on the inner end of the sleeve 60 and having a cutout 62 formed thereon engaged with the projection 63 of the claw 59, a second ratchet wheel 64 (not shown) provided under the ratchet wheel 61 of the drawing and having a cutout 65 (FIG. 12) formed on the outer periphery thereof, another stopper claw 66 having a projection 67 and pivotally supported on a shaft 68 engaged with the cover 13' of the casing and also having a branch portion 69 adapted to be engaged with the projection 63 of the claw 59, a gear 70 engaged on the outer projection of the sleeve 60, an intermediate or idle gear 71 meshed with the gear 70, and a gear 72 secured to the shaft 16 and meshed with the intermediate gear 71.

In operation of the blade interlocking mechanism thus constructed, the trochoidal movement of the wiper arm will be at first described hereinafter with respect to the FIGS. 8 through 12. In this case, when the sector 33 is driven by the push rod (not shown), the former drives the gear 32 rotating it. When the gear 32 is driven rotating clockwise as designated by U in FIG. 10, the ratchet claw 48 is also driven to rotate clockwise as shown by U, because the ratchet claw 48 is secured by the pin 47 to the gear 32, the ratchet wheel 50 is carried on the boss shaft 29 of the crank arm 10 wherein the ratchet claw 48 is engaged with the cutout 51 and the stopper claw 53 is engaged with the cutout 52 at the projection 54 and the branch portion 56 of the stopper claw 53 is pushed by the projection 49 of the ratchet claw 48. The projection 49 of the ratchet claw 48 pushes a wall 73 of the cutout 51 of the ratchet wheel 50 pushing at the same time the branch portion 56 of the stopper claw 53. Since the stopper claw 53 is pivotally rocked around the shaft 55, the projection 54 thereof is released from the cutout 52 of the ratchet wheel 50 so that it allows the crank arms 10 and 10' to rotate freely. The crank arms 10 and 10' start to rotate when it is depressed by the claw 48, but as the crank arm rotates to a predetermined angle the branch portion 56 of the stopper claw 53 rides across the outer periphery of the projection 49 of the ratchet claw 48 with the result that the claw 53 tends to return back. As the drive gear 32 continues to rotate further, the crank arms 10 and 10' integral with the ratchet wheel 50 continues to rotate accordingly, then when it rotates one revolution it returns to the original position. The sector 33 starts to reciprocate counterclockwise in the opposite direction of the arrow U, accordingly the ratchet claw 48 starts to rotate in the opposite direction. Since the ratchet claw 48 ceases depressing the branch portion 56 of the stopper claw 53, the spring 57 pulls the stopper claw 53 so that the projection 54 of the stopper claw 53 engages with the cutout 52 of the ratchet wheel 50 with the result that rotation of the crank arms 10 and 10' are prevented by the engagement. When the drive gear 32 rotates approximately one revolution after it starts to rotate in reverse direction, the ratchet claw 48 rides across the branch portion 56 of the stopper claw 53 so that the end of the projection 49 of the ratchet claw 48 contacts with the end of the branch portion 56 of the stopper claw 53, the position is returned to the original one.

When the wiper arm 11 rotates in the direction designated by an arrow V in FIG. 8, the sector 33 rotates in a reverse direction to the reciprocating direction as previously described. Thereupon, the crank arm 10 is stopped by the stopper claw 53 as previously described, but the ratchet claw 59 is driven by the pin 58 mounted on the sector 33 in the direction designated by an arrow W in FIG. 12. The projection 63 of the ratchet claw 59 pushes the wall of the cutout 62 of the ratchet wheel 61 which is part of the sleeve 60, at the same time the projection 63 of the ratchet claw 59 pushes the branch portion 69 of the stopper claw 66. It follows that the stopper claw 66 rotates around the shaft 68 as a center, and the end 67 of the stopper claw 66 is released from the cutout 65 of the second ratchet wheel 64 which is part of the sleeve 60 to allow the sleeve 60 to rotate freely. When the sector 33 rotates a predetermined angle, the branch portion 69 of the stopper claw 66 is released from the projection 63 of the ratchet claw 59 to cause the branch portion 69 to ride across the outside thereof. Then, the sector 33 rotates during one click of the ratchet wheel 61 to stop the movement of the direction. During this movement the rotation is transmitted from the sleeve 60 through the gears 70, 71 and 72 causing the base gear 15 to rotate with the shaft 16. This rotates the wiper arm 11 through the gears 20 and 24 and the shaft 25. Here, since the crank arm 10 stops as previously described, the wiper arm 11 merely rotates circularly around the shaft 25 as a center. The relationship between the rotated angles of the gears 70 and 72 is determined so that the circular movement thereof ends when the wiper arm 11 returns to the original position. When the sector 33 ends the reciprocating return rotation, the stopper claw 66 is returned by the spring 76 (FIG. 12) so that since the projection 67 of the stopper claw 66 rotates one click of the second ratchet wheel 64 it is engaged with the next cutout 77. When the ratchet claw 59 starts to rotate in the reverse direction to that designated by an arrow W (FIG. 12) and accordingly in the reciprocating movement, the sleeve 60 is maintained fixed by the stopper claw 66 so that the ratchet claw 59 rides across the branch portion 69 of the stopper claw 66 to return to the original state as previously described. During this period a trochoidal movement is made as previously described, the base gear 15 stopping while the crank arm 10 rotates.

In summary, in one reciprocating movement, the base gear 15 is fixed to the cover 13 of the casing, the crank arm 10 rotates the sector 33 through the ratchet wheel 50 and drive gear 32. Thus, the blade 12 makes a trochoidal movement during the reciprocating return movement, the crank arm 10 is fixed by the claw at the position T (FIG. 8) of the end of the one reciprocating movement so that the base gear 15 is driven to rotate by the claw 59 supported by the pin 58 on the sector 33 through the ratchet wheel 61. Thus, the blade 12 makes a circular movement around the position T as a center. In these cases, the claws 48 (FIG. 10) and 59 (FIG. 12) are free to rotate against the reverse rotation to that of the arrows U (FIG. 10) and W (FIG. 12) of the sector 33 and accordingly prohibiting the prevention of the movement of the claws 48 and 59.

Figure 13:
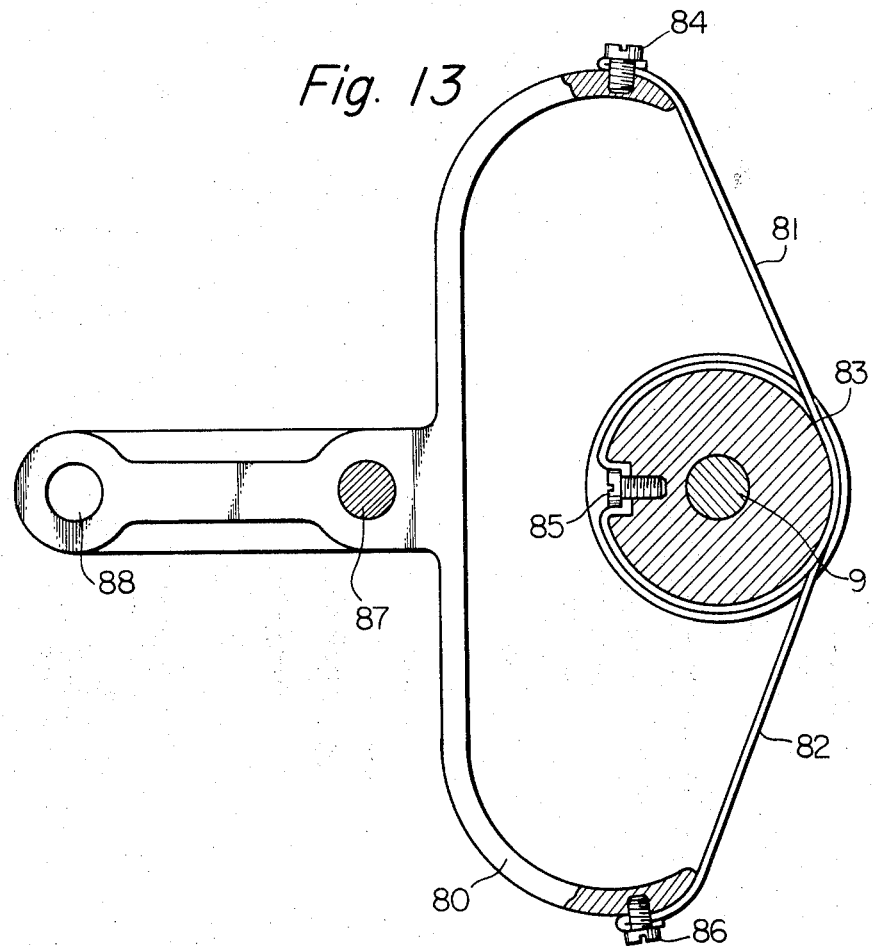
FIG. 13 is a plan view of a crank arm drive mechanism for driving the crank arm by means of a wire and pulley in the blade interlocking mechanism.
Figure 14:
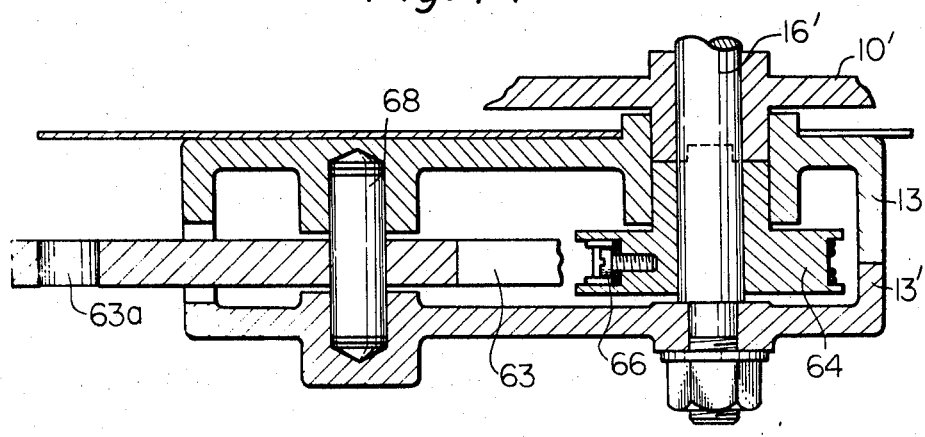
FIG. 14 is a longitudinal section view of the crank arm drive mechanism shown in FIG. 13.

FIGS. 13 and 14 show part of an alternative blade interlocking mechanism using a fork arm with wires instead of the sector and also using a drive pulley instead of the drive gear as in the previous embodiment. This mechanism comprises a fork arm 80 with wires 81 and 82, instead of the sector 33, a drive pulley 83 instead of the drive gear 32, said wire 81 being fixed at one end to the one end of the fork arm 80 by a screw 84 and at the other to the drive pulley 83 by a screw 85, the wire 82 being similarly fixed at one end to the other end of the fork arm 80 by a screw 86 and at the other to the drive pulley 83 by the screw 85, said fork 80 being rotatably supported by a shaft 87 as a center and having the other projection 88 at which the fork 80 is driven by a push rod (not shown) to rotate reciprocally.

When the fork arm 80 is driven by the push rod (not shown) as previously described, the drive pulley 83 is pulled by the wires 81 and 82 alternately causing the pulley to rotate reciprocally around the shaft 16. Thus, the crank arm 10 rotates accordingly causing the wiper arm 1 to move trochoidally.

It is understood from the foregoing description that the wiper blade of a windshield wiper asembly constructed according to the present invention moves in a trochoidal manner wiping a larger area of the windshield than the conventional wiper moving circularly.

When a wiper of this type is used for a windshield of an automobile wherein two of them are used, one at the right and one at the left part of the windshield, the total center portion high enough as well as the right and left portions of the upper corners of the windshield will be covered by the wiping action.

It is further understood that the overlapping portion of the windshield wiper is lessened as compared to the conventional wiper at the center portion of the windshield. The extent of interference of the two windshield wipers with each other is also lessened and when the blades are not needed they may be retained parallel with the lower edge of the windshield, and furthermore, there is no need to bend the blades while driving. This wiper therefore contributes greatly to the safety of driving an automobile.

In order to further improve the previous embodiment having a characteristic illustrated in FIG. 1 when the blade 12 moves at the portion designated by A4, A5, A6 and A7 the wiper arm 11 moves slower than in the other positions while when the wiper arm 11 reverses the wiping movement it moves faster than in the other positions causing the wiper arm to make noise and to consume more driving power than the mean driving power consumed during the reverse motion. FIGS. 15 through 18 show a further embodiment with this principle.

In principle of this embodiment the wiper arm moves at an irregular speed relative to the rotating speed of the crank arm so that only at a certain point the wiper blade 12 moves at a constant speed. Further detailed explanation will be described hereinafter with reference to FIG. 15. Here, the rotating center of the crank arm is at the origin O, and the wiper arm rotates around the point D on the crank arm as a center. The point A is one point on the wiper blade. If the unit length of OD is 1, then the length of DA is R. The angle between the line OD and x-axis is termed as $\alpha$, and the angle between the lines OD and DA is termed as $\beta$, the coordinates of the point A are expresed by the following formulas:

$$x = \cos \alpha + R \cos (\beta + \alpha) \quad (3)$$
$$y = \sin \alpha + R \sin (\beta + \alpha) \quad (4)$$

In case of a hypotrochoidal movement, since the wiper blade moves in opposite direction relative to the crank arm, $\beta$ may be substituted by $-\beta$, expressed as:

$$x = \cos \alpha + R \cos (\beta - \alpha) \quad (5)$$
$$y = \sin \alpha - R \sin (\beta - \alpha) \quad (6)$$

Assuming that the speed of the point A relative to $\alpha$ is termed as $dl/d\alpha$, the following formula exists:

$$(dl/d\alpha)^2 = (dx/d\alpha)^2 + (dy/d\alpha)^2$$

if the Formulas 5 and 6 are differentiated by $\alpha$, the following formula will be obtained:

$$(dl/d\alpha)^2 = 1 + R^2(m'-1)^2 - 2R(m'-1) \cos \beta \quad (7)$$

where $m' = d\beta/d\alpha$ expressing the changing rate of the angles $\beta$ and $\alpha$.

Assuming that $$\frac{(\text{Total length of a locus of end of blade})}{(\text{Total length of} \times (\text{Total rotating angle of crank blade arm}) \quad \text{arm})}$$

$C = (dl/d\alpha)/R$ exists, and when the speed of the point A is constant relative to $\alpha$, C is constant. Therefore, the Formula 7 is calculated as follows:

$$1/R^2 + (m'-1)^2 - \{2(m'-1) \cos \beta\}/R = C^2 \quad (8)$$

If the Formula 8 is solved, $$m' = 1 + \sqrt{C^2 - (1 - \cos^2 \beta)/R^2} + (\cos \beta)/R$$

is obtained.

Since this is the case of a hypotrochoidal movement, the solution is one having a plus (+) sign of the quadratic equation.

Since R is large, the value of $(1 - \cos^2 \beta)/R^2$ is considered to be equal to zero. Accordingly, $$m' = d\beta/d\alpha = 1 + C + (\cos \beta)/R \quad (9)$$

If the mean value of $m'$ is nearly $\overline{m}$, $\beta = \overline{m}\alpha$ exists the Formula 9 is integrated, and when $\alpha$ is equal to zero, $\beta$ is also equal to zero, $$\beta = (1+C)\alpha + (\overline{m}/R) \sin \overline{m}\alpha \quad (10)$$

Since the ratio $n$ between the maximum $m_a$ and minimum $m_b$ of $m'$ is the ratio when the $\cos \beta$ in the Formula 9 is equal to $+1$ and $-1$, $n$ is:

$$n = 1 + \frac{2}{R(1-C)-1} \quad (11)$$

Further, if $\cos \beta$ is derived from the Formula 9 and then substituted into the Formula 7, the following equation is obtained:

$$(dl/d\alpha)^2 = 1 + 2R^2C - R^2(m'-1)^2$$

Here, if the ratio between the maximum and minimum of $dl/d\alpha$ is termed as S, the following is derived:

$$S^2 = 1 + \frac{(m_a + m_b - 2)(m_a - m_b)}{1 + R^2C - R(m_a - 1)^2} \quad (12)$$

In summary, if the requirement of the Formulas 9 and 10 is satisfied, the value of $dl/d\alpha$ becomes substantially constant so that the ratio S between the maximum and minimum thereof becomes the value shown in the Formula 12.

In order to embody this principle in the alternative of the present invention, this alternative provides the relation of the movement between the crank arm and wiper arm by means of an eccentric gear so as to provide an irregular motion therebetween.

Figure 16:
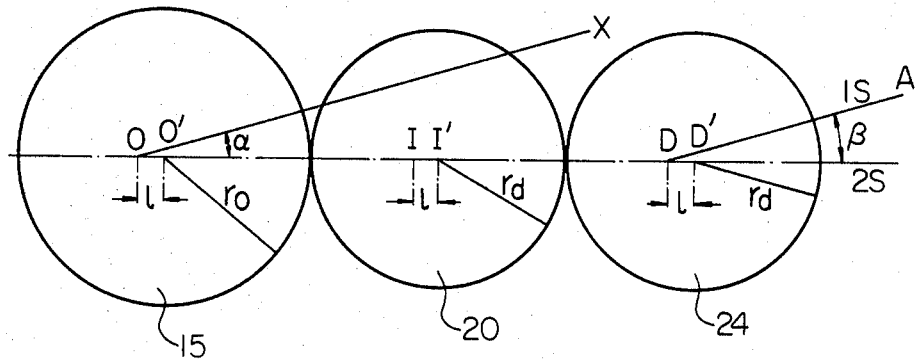
FIG. 16 is an explanatory illustration of the operation of an eccentric gear wheel used in the mechanism shown in FIG. 15.

FIG. 16 shows a schematic diagram of this embodiment wherein the center O' of the pitch circle of the gear 15 is eccentric to the extent of $e$ from the rotating center O of the crank arm the center line of which is designated by 2S so that the gear 15 is rotatably secured so as to rotate around the point O of the crank arm. The intermediate gear 20 rotates around the point I on the crank arm as a center, but the center I' of the pitch circle is spaced to the extent $e$ from the point I. The driven gear 24 rotates around the point D on the crank arm as a center, but the center of the pitch circle of the driven gear 24 is at the point D' spaced to the extent $e$ therefrom. Inasmuch as the wiper arm the axis of which is designated by 1S is mounted on the rotating shaft and accordingly the point D of the driven gear 24, it rotates around the point D as a center. Assume that the radius of the pitch circle of the fixed gear is expressed by $r_o$ and the radii of the pitch circles of the intermediate and driven gears are expressed by $r_d$, even if the angle $\alpha$ between the reference line Ox and the center line 2S of the crank arm varies in uniform speed, the change of the angle $\beta$ between the wiper arm and the crank arm is at a maximum when the angle $\alpha$ is equal to zero while the angle $\beta$ is at a minimum when the angle $\alpha$ is equal to 180 degrees. Since the wiper blade reciprocates always within a predetermined angle, the meshing of these gears 15, 20 and 24 does not produce any difficulty.

In consideration of the changes of the angles $\alpha$ and $\beta$ in case that the crank arm is fixed while the gears are rotated, if the angle $\alpha$ is equal to zero, the following formula is valid:

$$\frac{d\beta}{d\alpha} = \frac{r_d + e}{r_d - e} \times \frac{r_o + e}{r_a - e} \quad (13)$$

while when the angle $\alpha$ is equal to 180 degress, if there is not a big difference of the dimension between $r_d$ and $r_o$, the following equation is valid:

$$\frac{d\beta}{d\alpha} = \frac{r_d - e}{r_d + e} \times \frac{r_o - e}{r_d + e} \quad (14)$$

Therefore, the ratio $n$ between the maximum and minimum of $d\beta/d\alpha$ is:

$$n = \frac{(r_d + e)^3(r_o + e)}{(r_d - e)^3(r_o - e)} \quad (15)$$

In order to obtain the approximate value of the ratio between $e$ and $r_d$, if $r_d' = (r_d - r_o)/2$ is valid and this value is substituted into $r_d$ and $r_o$, the following equation is obtained:

$$\frac{r_d'}{e} = \frac{2}{n^{1/4} - 1} + 1 \quad (16)$$

Since an approximate value is used for $m'$ and accordingly in the relation between $d\beta/d\alpha$ and $\beta$ from the Formula 9, some error may exist. Also, the radius of the intermediate gear 20 may preferably be $(r_d + r_o)/2$.

Therefore, in order to obtain the eccentricity $e$ of the gear which is $r_d/e$ by the calculation, $n$ is derived from the Formula 11 and the value is substituted into the Formula 16.

In order to clarify the advantage of the present invention, one example of the calculation based on the aforementioned formula will be discussed hereinafter. Assume that $C = 0.25$ and $R = 6.5$ are valid. If these values are substituted into the Formula 9 then $\cos \beta$ is to be $\pm 1$ and the maximum and minimum values of $m'$ can be obtained giving, the maximum of $m' = 1,404$ and the minimum of $m' = 1,096$.

Therefore, $n = 1,281$ is obtained. If R and C are substituted into the Formula 11, the same values are derived. Then, the value of $n$ is substituted into the Formula 16 and $$r_d'/e = 32.4$$

is obtained. That is, one 1/32.4 of the radius of the gear is the preferable eccentricity. Consequently, the ratio between the maximum and minimum speeds of the point A and accordingly the point when R is equal to 6.5 may be obtained from the Formula 12.

$$S = 1.0205$$

That is, a variation of approximately 2 percent exists. On the other hand, the case that the eccentric gear is not used will hereinafter be calculated: Assuming that C is equal to $(dl/d\alpha)/R$ and this value corresponds to the reversal of $m$ in the Formulas 1 and 2. As seen from the comparison of the Formulas 1 and 2 with the Formulas 3 and 4, $m = \alpha/(\beta - \alpha)$ is valid so that $$m' = \beta/\alpha = 1 + 1/m$$

is valid. Then, in the Equation 8, assuming that $\cos \beta$ is $\pm 1$, the variation of the value C and accordingly $(dl/d\alpha)/R$ is as such the maximum and minimum of the value C are 0.428 and 0.0955, respectively. Therefore, the ratio S is equal to 4.48 so that a considerable speed difference exists.

Figure 15:
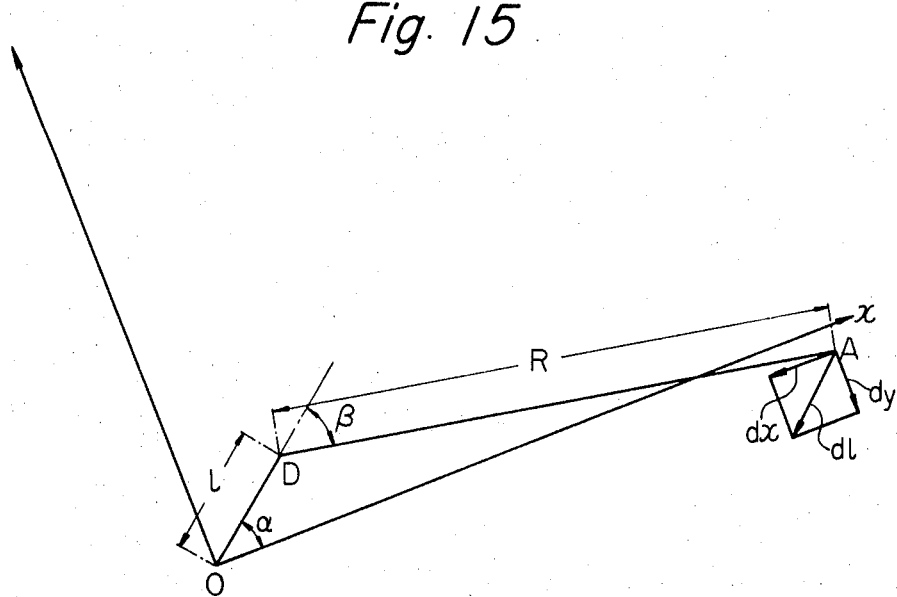
FIG. 15 is an explanatory illustration of the principle of operation of still another embodiment of the blade interlocking mechanism according to the present invention.

FIG. 17 shows still another alternative of a blade interlocking mechanism embodying the principle described with reference to FIGS. 15 and 16 according to the present invention. This mechanism comprises a crank arm 10, a wiper arm 11, a blade 12 (not shown) fixed at its center to the wiper arm 11, covers 13 and 13' of a casing mounted to the vehicle body 14, an interlock gearing including a base or drive gear 15a the center of the pitch circle of which is eccentric from the rotating center of the crank arm to the extent of $e$ and which has a radius $r_o$ of a pitch circle and is calked to a shaft 16 having a thread 17 for securing the shaft 16 to the cover 13' of the casing with a nut 18 at its one end and mounted at the other end within a hole 19 of the crank arm 10, an intermediate or idle gear 20a the center of the pitch circle of which is eccentric from the rotating center to the extent of $e$ and which has a radius $r_d$ of a pitch circle and is meshed with the drive wheel 15a and is also carried on a shaft 21 which is secured at both ends within holes 22 and 23 provided on the crank arm 10, respectively, and a driven gear 24a the center of the pitch circle of which is eccentric to the extent of $e$ from the rotating center and which has a radius $r_d$ of a pitch circle and is calked to a shaft 25 which has a serration 26 at one end for securing fixedly the root 27 of the wiper arm 11 thereto and is disposed within a hole 28 of the wiper arm 11 at the other end, a boss 29 of said crank arm 10 being rotatably engaged with a boss 30 of the cover 13' of the casing and having a recess 31, another drive gear 32 carried on the shaft 16, a sector 33 carried on a shaft 34 which is mounted at both ends within holes 35 and 36 of the covers 13 and 13' of the casing and having teeth 37 of the sector 33 meshed with the drive gear 32 and being rotatably driven by a push rod (not shown) connected at the other end 38.

In operation of the blade interlocking mechanism, the base gear 15a is fixed by shaft 16 with cover 13', the crank arms 10 and 10' are connected to the drive gear 32 and driven by the sector 33 and push rod (not shown).

When the sector 33 rocks reciprocally, the crank arm 10 is driven through the drive gear 15a. When the rotation angle of the drive gear 15a becomes $\alpha$, the driven gear 24a moves in a planetary motion so that the driven gear 24a rotates an angle $\beta$ different from the angle $\alpha$ of the drive gear 15a and the wiper arm 11 makes a trochoidal movement. If the eccentricity $e$ is derived from the aforementioned Formula 16, then point C on the wiper arm moves uniformly.

FIGS. 18–A and 18–B show a further alternative schematic diagram of the blade interlocking mechanism according to the present invention. This embodiment is theoretically the same as that shown in FIG. 16, but has larger differences of the radii of the gears 15a, 20a and 24a adapted to avoid the difficulty of meshing the gears. In this blade interlocking mechanism, the interlock gearing comprises a base or drive gear 15a the center of the pitch circle of which is eccentric to the extent of $e$ from the rotating center of the crank arm and which has a radius $r_e$ of a pitch circle and is calked to a shaft 16, an intermediate or idle gear 20a the center of the pitch circle of which is eccentric to the extent of $e$ from the rotating center and which has a radius $r_e$ of a pitch circle and is meshed with the drive gear 15a and is carried on a shaft 21, a second intermediate gear 20b coaxially secured to the shaft 21 and having a radius $r_o$ of a pitch circle and a driven gear 24a which has a radius $r_d$ of a pitch circle and is calked to a shaft 25.

Here, the eccentricities $e$ of the gears 15a and 20a are the same and the radii $r_e$ thereof are also the same.

In this embodiment, the Formula 15 is substituted by the following formula:

$$n = (r_e + e)^2 / (r_e - e)^2 \qquad (15')$$

And the eccentricity is expressed by the following formula:

$$r_e/e = 2/(n^{1/2} - 1) + 1 \qquad (16')$$

It is understood from the foregoing description that the present invention provides a preferable blade interlocking mechanism in which the wiper arm rotates at an irregular speed in relation to the speed of the crank arm so that the wiper blade moves at a uniform speed in a trochoidal movement in relation to the windshield.

We claim:

1. A blade interlocking mechanism of a windshield wiper assembly for an automotive vehicle comprising a crank arm, a wiper arm, a casing mounted to the vehicle body, a blade fastened at its center to said wiper arm, a drive gear securely mounted to a first shaft, an intermediate gear meshed with said drive gear and carried on a second shaft secured at both ends within holes provided within said crank arm, a driven gear secured to a third shaft which has a serration at one end for mounting securely the root of said wiper arm thereto and is inserted within a hole of said wiper arm at the other end, the boss of said crank arm being rotatably engaged with the boss of said cover, another drive gear carried on said one shaft, a sector carried on a fourth shaft which is mounted at both ends within holes of said cover of the casing and having at one end teeth meshed with another drive gear and being reciprocally driven by a push rod connected at the other end.

2. A blade interlocking mechanism as set forth in claim 1, wherein the length of the radii $r_3$ and $r_4$ of the pitch circles of said drive and driven gears have a relationship according to the formula $r_4/r_3 = m/(m+1)$ and said drive gear is stationary while said crank arm is reciprocally rotated an angle of $m\theta$, and said wiper arm rotates reciprocally angle of $\theta$ in an opposite direction whereby one end of said blade draws a hypotrochoidal curve.

3. A blade interlocking mechanism as set forth in claim 1, wherein the length of the radii $r_3$ and $r_4$ of the pitch circles of said drive and driven gears have a relationship according to the formula $r_4/r_3 = m/(m-1)$ and said drive gear is stationary while said crank arm is rotated an angle of $m\theta$, and said wiper arm rotates an angle of $\theta$ in the same direction whereby one end of said blade draws an epitrochoidal curve.

4. A blade interlocking mechanism of a windshield wiper assembly for an automotive vehicle comprising a crank arm, a wiper arm, a casing mounted to the vehicle body, a blade fastened at its center to said wiper arm, a drive timing wheel carried on one shaft and a driven timing wheel carried on a second shaft, a timing belt wound around said timing wheels for transmitting the driving power from said drive timing wheel to said driven wheel, the boss of said crank arm being rotatably engaged with the boss of said cover, a drive gear carried on said first shaft, a sector carried on a third shaft which is mounted at both ends within holes of said cover of the casing and having teeth meshed with the other drive gear and being reciprocally driven by a push rod connected at the other end.

5. A blade interlocking mechanism as set forth in claim 4, wherein the length of the radii $r_3$ and $r_4$ of the pitch circle of said drive and driven timing wheels have a relationship according to the formula $r_4/r_3 = m/(m+1)$ and said drive timing wheel is stationary while said crank arm is rotated an angle of $m\theta$ in the opposite direction whereby one end of said blade draws a hypotrochoidal curve.

6. A blade interlocking mechanism as set forth in claim 4, wherein the length of the radii $r_3$ and $r_4$ of the pitch circle of said drive and driven timing wheels have a relationship according to the formula $r_4/r_3 = m/(m-1)$ and said drive timing wheel is stationary while said crank arm is rotated an angle of $m\theta$ in the same direction whereby one end of said blade draws an epitrochoidal curve.

7. A blade interlocking mechanism of a windshield wiper assembly for an automotive vehicle comprising a crank arm, a wiper arm, a cover of a casing mounted to the vehicle body, a blade fastened at its center to said wiper arm, a drive wheel carried on one shaft and a driven wheel carried on a second shaft, wires wound around said wheels for transmitting the driving power from said drive wheel to said driven wheel and having a stopper screw for stopping said wires thereon, the boss of said crank arm being rotatably engaged with the boss of said cover, a drive gear carried on said one shaft, a sector carried on a third shaft which is mounted at both ends within holes of said cover of the casing and having teeth meshed with the other drive gear and being reciprocally driven by a push rod connected at the other end.

8. A blade interlocking mechanism of a windshield wiper assembly for an automotive vehicle comprising a crank arm, a wiper arm, a cover of a casing mounted to the vehicle body, a blade fastened at its center to said wiper arm, a drive wheel carried on a first shaft and a driven wheel carried on a second shaft, a band wound around said wheels for transmitting the driving power from said drive wheel to said driven wheel, the boss of said crank arm being rotatably engaged with the boss of said cover, a drive gear carried on said one shaft, a sector carried on a third shaft which is mounted at both ends within holes of said cover of the casing and having teeth meshed with the other drive gear and being reciprocally driven by a push rod connected at the other end.

9. A blade interlocking mechanism as set forth in claim 1 further comprising a pin provided in said drive gear without engaging said drive gear with the crank arm, a ratchet claw supported by said pin and having a projection projecting therefrom, a ratchet wheel provided at the boss of said crank arm and formed with a cutout on the periphery thereof engaged with said claw and also formed with another cutout on the outer periphery thereof, a stopper claw having a projection engaged with said cutout and pivotally supported on a fifth shaft rotatably secured to the cover of the casing and also having a branch portion adapted to be engaged with the projection of said ratchet claw, a spring connected at one end with said stopper claw, a second pin secured to said sector, another claw pivotally supported by said second pin, a sleeve engaged with said fourth shaft, another ratchet wheel provided on the inner end of said sleeve and having a cutout formed thereon engaged with the end of said claw, a third ratchet wheel provided adjacent to the second ratchet wheel and having a cutout formed on the outer periphery thereof, another stopper claw having a projection and pivotally supported on a sixth shaft engaged with the cover of the casing and also having a branch portion adapted to be engaged with the projection of said claw, a gear engaged on the outer projection of the sleeve, an intermediate gear meshed with the gear, and a gear secured to the first shaft and meshed with said intermediate gear.

10. A blade interlocking mechanism of a windshield wiper assembly for an automotive vehicle comprising a crank arm, a wiper arm, a cover of a casing mounted to the vehicle body, a blade fastened at its center to said wiper arm, a drive gear securely mounted to the first shaft, an intermediate gear meshed with said drive gear and carried on a second shaft mounted at both ends within holes provided in said crank arm, a driven gear secured to a third shaft which has a serration at one end for fastening securely the root of said wiper arm thereto and is inserted within a hole of said wiper arm at the other end, the boss of said crank arm being rotatably engaged with the boss of said cover, a drive pulley carried on said one shaft, a fork arm having at least two wires one of which is fixed at one end to the one end of said fork arm by a screw and at the other end to said drive pulley by another screw and the other end of which is also fixed at one end to the other end of said fork arm by a screw and at the other end to said drive pulley by the screw, said fork arm being rotatably supported at a shaft as a center and having the other projection at which the fork is driven reciprocally by a push rod.

11. A blade interlocking mechanism of a windshield wiper assembly for an automotive vehicle comprising a crank arm, a wiper arm, a casing mounted to the vehicle body, a blade fastened at its center to said wiper arm, a drive gear the center of the pitch circle of which is eccentric from the rotating center of said crank arm to the extent of $e$ and which is calked to a first shaft, an intermediate gear the rotating center of which is eccentric from the center of the pitch circle to the extent of $e$ and which is meshed with said drive gear and also is carried on a second shaft which is mounted at both ends within holes provided in said crank arm, a driven gear the center of the pitch circle of which is eccentric from the rotating center of the pitch circle to the extent of $e$ and which is calked to a third shaft which has a serration at one end for securely fastening the root of said wiper arm thereto and is inserted within a hole of said wiper arm at the other end, the boss of said crank arm being rotatably engaged with the boss of said cover of the casing, another drive gear carried on a fourth shaft, a sector carried on a fifth shaft which is mounted at both ends within holes of said cover of the casing and having teeth meshed with said drive gear and being reciprocally driven by a push rod connected at the other end.

12. A blade interlocking mechanism of a windshield wiper assembly for an automotive vehicle comprising a crank arm, a wiper arm, a casing mounted to the vehicle body, a blade fastened at its center to said wiper arm, a drive gear the center of the pitch circle of which is eccentric from the rotating center of said crank arm to the extent of $e$ and which is calked to a first shaft, an intermediate gear the rotating center of which is eccentric from the center of the pitch circle to the extent of $e$ and which is meshed with said drive gear and also is carried on a second shaft which is mounted at both ends within holes provided in said crank arm, a second intermediate gear coaxially mounted to the shaft, a driven gear which is calked to a third shaft which has a serration at one end for securely fastening the root of said wiper arm thereto and is inserted within a hole of said wiper arm at the other end, the boss of said crank arm being rotatably engaged with the boss of said casing, another drive gear carried on a fourth shaft, a sector carried on a fifth shaft which is mounted at both ends within holes of said cover of the casing and having teeth meshed with said drive gear and being reciprocally driven by a push rod connected at the other end.

References Cited

UNITED STATES PATENTS

| 2,516,808 | 7/1950 | Seger | 15—250.21 |

FOREIGN PATENTS

| 182,631 | 7/1955 | Austria | 15—250.23 |
| 827,531 | 1/1938 | France | 15—250.21 |
| 1,029,855 | 3/1953 | France | 15—250.21 |
| 1,053,519 | 9/1953 | France | 15—250.21 |

PETER FELDMAN, Primary Examiner

U.S. Cl. X.R.

15—250.21, 250.23; 74—70